United States Patent [19]
Chen et al.

[11] Patent Number: 5,393,330
[45] Date of Patent: Feb. 28, 1995

[54] CATIONIC EMULSIONS OF ALKYLALKOXYSILANES

[75] Inventors: Ming J. Chen, Garnerville; Antonio Chaves, White Plains, both of N.Y.

[73] Assignee: OSi Specialties, Inc., Danbury, Conn.

[21] Appl. No.: 84,867

[22] Filed: Jun. 30, 1993

[51] Int. Cl.$^6$ ............................................... C09D 5/20
[52] U.S. Cl. ................................... 106/2; 106/287.14; 252/357; 528/33; 556/450
[58] Field of Search ....................... 252/357, 312, 314; 106/287.14, 287.16, 2; 528/33; 556/450

[56] References Cited

U.S. PATENT DOCUMENTS

| | | | |
|---|---|---|---|
| 4,273,813 | 6/1981 | Meddaugh | 427/387 |
| 4,433,013 | 2/1984 | Puhringer | 427/337 |
| 4,648,904 | 3/1987 | DePasquale et al. | 106/287.14 |
| 4,778,624 | 10/1988 | Ohashi et al. | 252/312 |
| 4,877,654 | 10/1989 | Wilson | 427/387 |
| 4,889,747 | 12/1989 | Wilson | 427/221 |
| 4,891,166 | 1/1990 | Schaefer et al. | 260/404.5 |
| 4,895,964 | 1/1990 | Margida | 556/425 |
| 4,937,104 | 6/1990 | Puhringer | 427/344 |
| 5,066,520 | 11/1991 | Freiberg | 427/379 |
| 5,074,912 | 12/1991 | Liles et al. | 106/2 |
| 5,091,002 | 2/1992 | Schamberg et al. | 106/2 |
| 5,226,954 | 7/1993 | Suzuki | 106/2 |

FOREIGN PATENT DOCUMENTS

| | | |
|---|---|---|
| 0469624 | 5/1992 | European Pat. Off. |
| 3115485 | 5/1991 | Japan |
| 3174378 | 6/1991 | Japan |
| 3232527 | 10/1991 | Japan |
| 4092875 | 3/1992 | Japan |
| 4164877 | 6/1992 | Japan |

*Primary Examiner*—Mark L. Bell
*Assistant Examiner*—Paul Marcantoni
*Attorney, Agent, or Firm*—Andrew S. Reiskind

[57] ABSTRACT

The present invention teaches masonry water repellents comprising aqueous emulsions of alkylalkoxysilanes with either a quaternary ammonium surfactant or a mixture of a quaternary ammonium surfactant with an amino and/or a nonionic surfactant. The alkylalkoxysilane is present at a level of about one to sixty weight percent of the final solution weight. The surfactants are present at levels of about 0.05 to 25 weight percent of the final solution weight. The useful quaternary ammonium surfactants are alkyltrimethyl or dialkyldimethyl ammonium compounds or quaternary ammonium modified dimethylpolysiloxanes. Amino and nonionic surfactants are used as additives to the quaternary surfactants. The types of nonionic surfactants contemplated herein are alkylamines and alkyl acetylenic alcohols.

24 Claims, No Drawings

CATIONIC EMULSIONS OF ALKYLALKOXYSILANES

BACKGROUND

Concrete structures can undergo accelerated deterioration due to corrosion of the reinforcing steel rods. The corrosion is caused by the gradual introduction of chloride into the concrete from deicing salts. Applying penetrating sealers can greatly diminish the intrusion of chloride into the concrete.

Solutions of alkyltrialkoxysilanes in organic solvents have been used very effectively to impart water repellent properties to porous masonry substrates such as mortar and concrete. These formulations penetrate the masonry substrate and provide a significant hydrophobic layer. However, solvent base formulations are undesirable due to the large amount of volatile organic components that are released into the air during their use. Various state regulations prohibit the volatile organic content (VOC) of an architectural coating from exceeding four hundred grams per liter.

The prior art solvent base coatings have not met these regulations. To reduce the amount of organic compounds released into the air, preparations of aqueous emulsions of alkyltrialkoxysilanes have been reported.

The utility of silanes in such aqueous emulsions, especially alkoxysilanes, as masonry water repellents is a widely known use because of their hydrophobic nature. For example, U.S. Pat. No. 4,648,904 issued to DePasquale and Wilson teaches a porous masonry water repellent composition comprising: a hydrolyzable silane, an emulsifying agent and water. U.S. Pat. No. 4,877,654 issued to Wilson teaches a similar composition but also contains a buffering compound to maintain the composition within the pH stable range. U.S. Pat. No. 5,074,912, issued to Liles and Klein also teaches a water repellent composition for treating porous substrates consisting of an emulsion containing water, at least one surfactant, and a siloxane. However, the emulsifiers taught therein are generally nonionic surfactants and only one type of silane (the active ingredient) may be used at a time in each emulsion. It has been found that nonionic emulsifiers, in particular highly ethoxylated surfactants, reduce the hydrophobic effect of these compositions. This leads to an increase in water absorption of the masonry material and in most cases a reduction in penetration depth of the silane.

Another example of prior art aqueous emulsions is taught in U.S. Pat. No. 4,433,013 issued to Puhringer, which discloses a water-sealant for inorganic porous mineral substrates which comprise an emulsion of at least one silane, one deactivatable surfactant, an organic alcohol, and water. The surfactants taught as useful therein include fatty acid esters, and particularly alcohol/alkylene oxide adducts.

Moreover, in unrelated fields, the manufacture and use of quaternary ammonium pendant siloxane copolymers have been known. See U.S. Pat. No. 4,895,964, issued to Margida. The uses in the prior art of such quaternary polylsiloxanes have been in cosmetic preparations, as disclosed in the U.S. Pat. No. 4,891,166, issued to Shaefer and Krakenberg and in waterproofing compositions with good fungitidal and mildewcidal properties, as disclosed in European Patent Application, Publication No. 0,469,624, to Yoshioka.

SUMMARY OF INVENTION

The present invention teaches masonry water repellents comprising aqueous emulsions of alkylalkoxysilanes with either a quaternary ammonium surfactant or a mixture of a quaternary ammonium surfactant with an amino and/or a nonionic surfactant, The alkylalkoxysilane is present at a level of about one to sixty weight percent of the final solution weight. The surfactants are present at levels of about 0.05 to 25 weight percent of the final solution weight, The useful quaternary ammonium surfactants are alkyltrimethyl or dialkyldimethyl ammonium compounds or quaternary ammonium modified dimethylpolysiloxanes, Amino and nonionic surfactants are used as additives to the quaternary surfactants. The types of nonionic surfactants contemplated herein are alkylamines and alkyl acetylenic alcohols.

DESCRIPTION OF INVENTION

The present invention relates to the preparation of stable aqueous emulsions which impart hydrophobic properties to masonry materials and which penetrate into the masonry material to provide a significant hydrophobic layer. The term "masonry" is intended to include any porous inorganic substrate, particularly building compositions and including, but not limited to, structural ceramics such as common brick, paving brick, face conduits, roofing tile, flue lining, cements such as Portland cement, calcined gypsum products, molding and building plaster and stucco, magnesia cement, insulation products such as electrical and thermal insulators (diatomaceous earth brick) and pomelain spark plugs. The term also includes stone, tile, artificial stone, adobe, concrete and reinforced concrete such as found in roadways, bridge decks, airport runways, parking garage decks, and other concrete building structures. The hydrophobic properties imparted by the emulsion of the present invention applied over masonry surfaces protect the surfaces from corrosion, acidic rain, salt water and other degradents which water could otherwise deliver into the masonry.

An aqueous emulsion of the present invention consists of an alkylalkoxysilane or mixtures of alkylalkoxysilanes, emulsifiers and water. Optionally, a buffer may be added to maintain the pH of the emulsion in the preferred range of between 6 and 8. The alkylalkoxysilanes are the hydrophobic active ingredients in the emulsion that block the penetration of water into the masonry. The water is the solvent that carries the active ingredient into the masonry. The emulsifier is necessary to solubilize the silane in water. The buffer controls the pH of the solution.

The alkylalkoxysilanes for use herein are of the general structure $R^1{}_a Si(OR^2)_{4-a}$ where $R^1$ is $C_1$ to $C_{18}$ alkyl groups in straight or branched chain-configuration or aryl or aralkyl groups, $R^2$ may be $C_1$ to $C_5$ alkyl groups in straight or branched chain configuration and a is one (1) to three (3). The preferred $R^1$ is $C_5$ to $C_{12}$ alkyl groups and $R^2$ is $C_2$ to $C_4$ alkyl groups. The most preferred silane for use herein is octyltriethoxysilane and octyltriisopropoxysilane. Alkyltrimethoxysilanes tend to hydrolyze more readily and decrease the shelf life of the emulsion and so are not preferred.

Moreover, mixtures of silanes may be used in emulsions of the present invention. By using a mixture of silanes in the emulsion one can choose one silane for its hydrophobic properties and another for its ability to penetrate masonry. Previously, mixtures of silanes could not be used because it was difficult to match two different silanes to a single emulsifier. Specific examples of silanes used in accordance with the present invention include, but are not limited to, methyltriethoxysilane, methyltri-n-propoxysilane, ethyltriethoxysilane, dimethyldimethoxysilane, dimethyldiethoxysilane, ethyltri-n-propoxysilane, propyltriethoxysilane, propyltri-n-propoxysilane, butyltriethoxysilane, dibutyldimethoxysilane, isobutyltrimethoxysilane, di-isobutyldimethoxysilane, isobutyltriethoxysilane, 4-chlorobenzyl triethoxysilane, 4-bromobenzyl tri-n-propoxysilane, phenyltriethoxysilane, octyltriethoxysilane, octyltriisopropoxysilane, dodecyltribromosilane, tetradecyltriethoxysilane, hexadecyltriethoxysilane, octadecyltriethoxysilane, mixtures thereof, and admixtures thereof with dimers, trimers and other oligomers thereof.

The emulsifiers for use herein include a quaternary ammonium surfactant or a mixture of quaternary ammonium surfactants with amino or specific nonionic surfactants. The quaternary ammonium surfactants are alkyl quaternary ammonium compounds or quaternary ammonium modified polysiloxanes. The quaternary ammonium compounds of the present invention are of the formula $R^1_a R^2_{4-a}N^+X^-$ where $R^1$ is $C_8$ to $C_{22}$ alkyl group, $R^2$ are relatively short alkyl groups of 1–3 carbons in length and a is 1 or 2. Specific examples of quaternary ammonium surfactants useful in accordance with the present invention include, but are not limited to, the following examples: ARQUAD 2C-75, C-33W, C-50, 2HT-75, S-50, T-50, 12-37W, 12-50, 16-29W, 16-50 and 18-50 (commercially available from AKZO Chemicals, Inc. of Chicago, Ill.), JET QUAT C-50, S-2C-50, S-50, T-2C-50, T-50 and 2C-75 (commercially available from Jetco Chemicals, Inc. of Corsicana, Tex.), M-QUAT 32-2475 (commercially available from Mazer Chemicals, Inc. of Mission Viejo, Calif.), TINEGAL MR-50 (commercially available from Ciba-Geigy Corp. of Basel, Switzerland), TOMAH Q-17-2, Q-18-15, Q-311, Q-S11 and Q-D-T (commercially available from Tomah Products, Inc., a divison of Exxon Chemical Co. of Milton, Wis.), and VARIQUAT A-200, B-200 and K-300 (commercially available from Sherex Chemical Co., Inc. of Dublin, Ohio).

The general formula of the quaternary ammonium modified polysiloxanes for use herein is $MeR^1R^3_3Si(OSiMeR^3)_x(OSiR^2R^3-M)_ySiR^1R^3Me$ where x=3–25 and y=0–5, with the preferred range for y being 2–3. The $R^1$'s may be chosen from Me or $R^2$-M and each $R_1$ may be different from one another. $R^2$ are bivalent hydrocarbon groups with at least three carbon atoms and not larger than 22, which may have a hydroxyl group and may be interrupted by an oxygen atom and each may be different from one another. $R^3$ may be a methyl, ethyl or phenyl group. M is

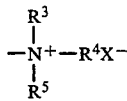

where $R^3$, $R^4$, $R^5$ are alkyl groups with 1 to 3 carbon atoms which may have hydroxy substitutions thereon. $X^-$ is an inorganic or organic anion. Specific examples of the counter ion $X^-$ include, but are not limited to, halides, acetate, citrate, bicarbonate, hydrogen phosphate, dihydrogen phosphate, sulfate, hydrogen sulfate and methosulfate, while a halide or acetate is preferred. An example of the $R^2$-M group is

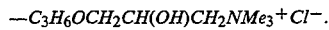

A preferred silicone quaternary ammonium chloride is where y=0 and has the formula of:

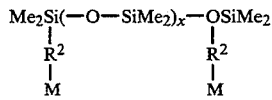

where $R^2$ and M are as above. Also note that while the dimethyl siloxane is the preferred building block for the polysiloxane copolymer, diethyl or phenylmethyl siloxane may also be used herein as the building block for the copolymer.

Y varies proportionally to the need for aqueous compatibility of the surfactant. Similarly, the larger the alkyl group of the silane (the active ingredient), the larger the hydrophobic group (x of the emulsifier) needs to be.

Co-surfactants may be used as additives with the quaternary ammonium surfactants. The types of surfactants useful for such a purpose are alkyl amines, which become protonated in the aqueous solution, and nonionics which are hydroxylated ethoxylated acetylenic hydrocarbons, such as ethoxylated tetramethyl decynediol (SURFYNOL 420, available from Air Products of Allentown, Pa.). In distinction, ethoxylated amines e.g., bis(2-hydroxyethyl) cocoamine (ETHOMEEN C/12 available from Akzo Chemicals Inc. of Chicago, Ill.)) have been found not to be effective for this purpose. The ethoxylated acetylenic hydrocarbon nonionics, for this purpose, should only be present at about 0.1 to 1.0 weight percent of the total emulsion and preferably about 0.3 weight percent. The alkyl amines have been found effective at weight percentages about equal to those of the quaternary ammonium surfactant present.

Specific examples alkyl amines useful as co-surfactants in accordance with the present invention include, but are not limited to, dodecylamine, hexadecylamine, octadecylamine, amines derived from coconut oil, hardened tallow, tallow, soya, methyl dicoco amine, methyl dihydrogenated tallow amine, dimethyl cocoamine, dimethyl dodecyl amine, and dimethyl hexadecyl amine. Specific examples of nonionic surfactants useful as co-surfactants in accordance with the present invention include, but are not limited to, SURFYNOL 61, 82, 104, 420, 440 and 465 (available from Air Products).

Optionally, a small amount of organic solvent can be used as an additional stabilizer. These organic solvents have a synergistic affect on the emulsion and are not intended to be added at the level of a solvent, but act rather as a stabilizer of the emulsion. Said solvents should be added at less than 10.0 weight percent of the emulsion, and preferably at about 1-2 weight percent. Specific examples of solvents useful in accordance with the present invention include, but are not limited to, alcohols such as methanol, ethanol, propanol, 2-propanol, butanol, 2-methyl-2-propanol, 2-butanol and pentanol.

The silane may be present in an amount ranging from 1.0 to 60 weight percent of the emulsion. Varying the amount of silane in the emulsion changes the performance of the emulsion since the silane is the active ingredient. The emulsifier is present in an amount ranging from 0.05 to 25 weight percent of the emulsion. The greater the amount of silane, the greater the amount of emulsifier required to solubilize the silane in water. The weight ratio of silane to emulsifier should be about 1:1 to 120:1 and preferably is about 10:1. Water is present in an amount ranging from 15 to 98.95 weight percent of the emulsion.

The aqueous emulsions are typically prepared by mixing the surfactant or mixture of surfactants with an alkyltrialkoxysilane or a mixture of alkylalkoxysilanes. Water is then added and the mixture is blended to provide a white, milky emulsion. The pH of the resulting emulsion may be adjusted to provide a final emulsion with a pH of 7.0+1.0. A pH outside of this range is possible, but it shortens the shelf life of the emulsion. Substances which can be used to adjust the pH are organic or inorganic buffers including sodium acetate, sodium citrate, sodium carbonate, sodium bicarbonate, sodium hydrogen phosphate, sodium dihydrogen phosphate, the corresponding potassium salts, and organic amines and their salts. When organic amine surfactants are used as co-emulsifiers, the addition of buffer usually is not required because the pH is normally in the desired range of 6 to 8.

The emulsions of the present invention may be applied onto the surface to be protected in a variety of ways that are well known in the art, including, but not limited to, brushing, spraying and rolling the emulsion on the surface.

When an emulsion of the present invention was applied at the rate of 125 square feet per gallon as a single coat, the industry standard for testing, it reduced the water gain of a two-inch concrete cube by approximately 70 percent and the silane had a penetration depth of at least 0.2 inches. A typical emulsion prepared with surfactants has a penetration depth of only 0.1 inches.

EXAMPLES

Coating and Testing Procedure

The penetrating sealers described below were applied to two-inch concrete cubes at a rate of 125 square feet per gallon with a small, bristle brush and allowed to cure on a wire rack for two days at ambient conditions. The coated cubes were weighed and then completely immersed in a water bath so that the concrete was more than one inch below the water surface. The cubes were weighed daily and the percentage weight increase was determined. When the soaking test was completed, the cubes were allowed to dry at ambient conditions in a laboratory hood. After the cubes were allowed to dry, they were broken in half. The inner surface of each cube was sprayed with water and the depth of penetration of the sealer was determined as a visible dry area of the concrete below the coated surface. This was easily measured with a ruler or caliper. The results of the sealers described below are set forth in Table I.

Example I

To 13.4 grams of octyltriethoxysilane was added 3.0 grams of dimethyldicocoammonium chloride (ARQUAD 2C-75 available from Akzo Chemicals Inc. of Chicago, Ill.). The mixture was stirred with a stirring bar for 30 minutes. To this mixture was then added 33.6 grams of deionized water and the mixture was stirred vigorously. A milky white emulsion resulted. The pH of the emulsion was adjusted with sodium phosphate dibasic to give a final pH of 7.4.

Example II

To 40.0 grams of octyltriethoxysilane was added 2.0 grams of ARQUAD 2C-75 in an Oster blender and mixed at low speed for one minute. 58.0 grams of water buffered to a pH of 7.0 with a phosphate buffer was added to the mixture and the mixture was stirred at a high speed for five minutes resulting in a white, milky emulsion. The pH of the resulting emulsion was found to be 6.8.

Example III

To 3.5 grams of octyltriethoxysilane and 0.5 grams of 1,10-bistrimethoxysilyldecane was added 0.4 grams of ARQUAD 2C-75. The mixture was stirred with a magnetic stirring bar. To this mixture was then added 5.6 grams of deionized water and the mixture was stirred vigorously. A white milky emulsion resulted. To the emulsion was added 0.02 grams of SURFYNOL 420. The emulsion was stirred for an additional thirty minutes.

Example IV

To 3.5 grams of octyltriethoxysilane and 0.5 grams of 1,10-bis(triethoxysilyl) decane was added 0.3 grams of ARQUAD 2C-75 and 0.05 grams of dimethyl di(hydrogenated-tallow)ammonium chloride (ARQUAD 2HT75 available from Akzo Chemicals Inc. of Chicago, Ill.). The mixture was stirred with a magnetic stirring bar. To this mixture was added 5.65 grams of deionized water and the mixture was stirred vigorously for four hours. A white milky emulsion resulted.

Example V

To 40.0 grams of octyltriethoxysilane was added 2.0 grams of ARQUAD 2C-75, and 2.0 grams of cocodimethyl amine (ARMEEN DMCD available from Azko Chemie America). The mixture was blended at low speed. To this mixture was added and blended at high speed 56.0 grams of water. A white emulsion resulted.

Example VI

To 40.0 grams of octyltriethoxysilane was added 2.0 grams of ARQUAD 2C-75 and 2.0 grams of ARMEEN DMCD. The mixture was stirred. To this mixture was added and mixed at high speed 55.7 grams of water. Finally, 0.3 grams of SURFONYL 420 was added and the mixture was stirred for thirty minutes.

Example VII

To 2 grams of octyltriethoxysilane was added 0.25 grams of M*D$_9$M* where M* is Me$_2$Si(O)C$_3$H$_6$OCH$_2$CH(OH)CH$_2$NMe$_3^+$Cl$^-$ and D is (OSiMe$_2$). The mixture was stirred with a stirring bar for 30 minutes. Afterwards, 2.74 grams of deionized water was added to the mixture and the mixture was stirred vigorously. A milky white emulsion resulted. To the emulsion was added 0.015 grams of SURFYNOL 420. The emulsion was stirred an additional 30 minutes. A stable milky white emulsion resulted.

Example VIII

To 48.66 grams of octyltriethoxysilane was added 4.87 grams of M*D$_9$M*, where M* is Me$_2$Si(O)C$_3$H$_6$OCH$_2$CH(OH)CH$^2$NMe$^3$+Cl− and D is as above, in an Oster blender and mixed at low speed for one minute.

67.76 grams of deionized water was added and the mixture was stirred at a high speed for five minutes resulting in a white, milky emulsion. To the emulsion was added 0.365 grams of SURFYNOL 420 and the mixture was stirred overnight with a magnetic stirrer.

Example IX

To 2.5 grams of octyltriethoxysilane was added 0.3 grams of $MD_{18}D^*_2M$, where $D^*$ is $MeSi(O)C_3H_6OCH_2CH(OH)CH_2NMe_3^+ Cl^-$ and M is $OSi(Me)_3$, and 0.5 grams of isopropyl alcohol. The mixture was stirred with a magnetic stirring bar. To this mixture was added 2.8 grams of water and the mixture was stirred vigorously for several hours. A white, milky emulsion resulted.

Comparative Example I

To 30 grams of absolute ethyl alcohol was added 20 grams of octyltriethoxysilane to make a 40% by weight silane solution.

Comparative Example II

To 20.0 grams of octyltriethoxysilane was added 0.56 grams of octylphenoxypolyethoxy ethanol and 0.24 grams of octylphenoxypolyethoxy ethanol [differentiate] in an Oster blender. The mixture was stirred at a low speed for one minute. Deionized water, 29.2 grams, was added quickly and the mixture was blended at a high speed for five minutes. A white, milky emulsion resulted.

Comparative Example III

To 30.0 grams of octyltriethoxysilane was added 0.42 grams of alkyloxypolyethyleneoxy ethanol (primary alcohol) and 0.78 grams of alkyloxypolyethyleneoxy ethanol (secondary alcohol) in an Oster blender at a low speed for one minute. 43.8 grams of deionized water was added and the mixture was blended for five minutes at a very high speed. A white, milky emulsion resulted.

Comparative Example IV

To 40.0 grams of octyltriethoxysilane was added 2.4 grams of alkanoxypolyethyleneoxy ethanol and 1.8 grams of cetyl trimethylammonium bromide. The mixture was stirred. To this mixture was added and mixed 55.8 grams of water.

Comparative Example V

To 40.0 grams of octyltriethoxysilane was added 5.0 grams of ARQUAD 2HT75 and 1.0 grams of ETHOMEEN C12. The mixture was stirred. To this mixture was added and mixed 54.0 grams of water.

TABLE I

| Coating | Weight Gain (%) (after 10 Days) | Depth of Penetration (Inches) |
| --- | --- | --- |
| No Coating | 5.3% | — |
| Example I | 1.6% | 0.20 |
| Example II | 1.5% | 0.20 |
| Example III | 1.2% | 0.20 |
| Example IV | 1.8% | 0.20 |
| Example V | 1.7% | 0.20 |
| Example VI | 1.8% | 0.25 |
| Example VII | 1.6% | 0.20 |
| Example VIII | 1.7% | 0.25 |
| Example IX | 1.7% | 0.25 |
| Comparative Example I | 1.6% | 0.20 |
| Comparative Example II | 2.0% | 0.10 |
| Comparative Example III | 2.2% | 0.10 |
| Comparative Example IV | 2.0% | 0.10 |
| Comparative Example V | 1.5% | 0.10 |

We claim:

1. A formulation for preparing an aqueous emulsion comprising:
   a. a silane;
   b. quaternary ammonium modified polysiloxane emulsifiers of the general formula $Me_2R^1Si(OSiMe_2)_x(OSiMeR^2M)_ySiRMe_2$, where $x=3-25$, $y=0-5$, $R^1$ is selected from the group consisting of Me or $R^2$-M, where $R^2$ is a bivalent hydrocarbon group having at least four carbon atoms and M is:

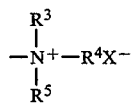

where $R^3$, $R^4$, and $R^5$ are alkyl groups with 1 to 3 carbon atoms and $X^-$ is an inorganic or organic anion.

2. The aqueous emulsion of claim 1, where the silane is of the general structure $R^1_aSi(OR^2)_{4-a}$ where $R^1$ is $C_1$ to $C_{18}$ alkyl groups in straight or branched chain configuration or aryl or aralkyl groups, $R^2$ are $C_1$ to $C_5$ alkyl groups in straight or branched chain configuration and a is one (1) to three (3).

3. The aqueous emulsion of claim 1, where $X^-$ is a halide or acetate.

4. The aqueous emulsion of claim 1, where $y=0$.

5. The aqueous emulsion of claim 1, additionally comprising nonionic surfactants present at about 0.05 to 2.5 weight percent of the emulsion.

6. The aqueous emulsion of claim 5, where the nonionic surfactant is a trialkyl amine.

7. The aqueous emulsion of claim 5, where the nonionic surfactant is an ethoxylated acetylinic hydrocarbon.

8. The aqueous emulsion of claim 1, where the weight ratio of silane to emulsifier is about 4:1 to 120:1.

9. The aqueous emulsion of claim 1 additionally comprising a buffer.

10. The aqueous emulsion of claim 1 additionally comprising an organic solvent.

11. The aqueous emulsion of claim 1 where $R^2$ has a hydroxyl group.

12. The aqueous emulsion of claim 1 where the $R^2$-M group is $C_3H_6OCH_2(OH)CH_2NMe_3^+Cl^-$.

13. A formulation to prepare an aqueous emulsion consisting essentially of:
    a. at least one silane; and
    b. an emulsifier comprised of quaternary ammonium halides of the general formula $R^1_a(R^2)N_{(4-a)}^+X^-$, where $R^1$ are alkyl groups of eight to twenty-two carbons in length, $R^2$ are alkyl groups of 1–3 carbon in length, and $X^-$ is an inorganic or organic anion.

14. A process for making a water-sealant composition comprising mixing:
    a. 1.00 to 60 weight percent of a silane;
    b. 0.05 to 25 weight percent of an emulsifier comprised of quaternary ammonium halides of the general formula $R^1{}_a(R^2)N_{(4-a)}{}^+X^-$, where $R^1$ are alkyl groups of eight to twenty-two carbons in length, $R^2$ are alkyl groups of 1-3 carbon in length, and $X^-$ is an inorganic or organic anion.

15. The aqueous emulsion of claim 14, where the silane is of the general structure $R^1{}_aSi(OR^2)_{4-a}$ and where $R^1$ is $C_1$ to $C_{18}$ alkyl groups in straight or branched chain configuration or aryl or aralkyl groups, $R^2$ are $C_1$ to $C_5$ alkyl groups in straight or branched chain configuration and a is one (1) to three (3).

16. The aqueous emulsion of claim 14, where $X^-$ is a halide or acetate.

17. The aqueous emulsion of claim 14, additionally comprising nonionic surfactants present at about 0.05 to 2.5 weight percent of the emulsion.

18. The aqueous emulsion of claim 14, where the weight ratio of silane to emulsifier is about 4:1 to 120:1.

19. The aqueous emulsion of claim 14 where $R^2$ has a hydroxyl group.

20. A mixture for preparing an aqueous emulsion comprising:
   a. a silane;
   b. an emulsifier selected from the group consisting of (1) quaternary ammonium halides of the general $R^1{}_a(R^2)_{4-a}N^+X^-$ where $R^1$ are alkyl groups of eight to twenty-two carbons in length, $R^2$ are alkyl groups of 1-3 carbons in length and $X^-$ is an inorganic or organic anion and (2) a quaternary ammonium modified polysiloxane of the general formula;

$Me_2R^1Si(OSiMe_2)_x(OSiMeR^2-M)_ySiRMe_2$, where $x=3-25$, $y=0-5$, $R^1$ is selected from the group consisting of Me or $R^2$-M, where $R^2$ is a bivalent hydrocarbon group having at least four carbon atoms and M is:

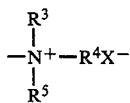

where $R^3$, $R^4$, and $R^5$ are alkyl groups with 1 to 3 carbon atoms and $X^-$ is an inorganic or organic anion; and
   c. a nonionic surfactant comprised of a hydroxylated or ethoxylated acetylenic hydrocarbon.

21. The mixture of claim 20 where the silane is of the structure $R^1{}_aSi(OR^2)_{4-a}$ and where $R^1$ is $C_1$ to $C_{18}$ alkyl groups in straight or branched chain configuration or aryl or aralkyl groups, $R^2$ are $C_1$ to $C_5$ alkyl groups in straight or branched chain configuration and a is one (1) to three (3).

22. The mixture of claim 20, where $X^-$ is a halide or acetate.

23. The mixture of claim 20, where the weight ratio of silane to emulsifier is about 4:1 to 120:1.

24. The mixture of claim 20 where $R^2$ has a hydroxyl group.

* * * * *